(12) United States Patent
Pettersen et al.

(10) Patent No.: US 6,389,158 B1
(45) Date of Patent: May 14, 2002

(54) SYSTEM AND METHOD FOR DETERMINING SPATIAL COORDINATES

(75) Inventors: Alf D. Pettersen, Gjettum; Øyvind Røtvold, Hvalstad, both of (NO)

(73) Assignee: Metronor AS, Nesbru (NO)

( * ) Notice: Subject to any disclaimer, the term of this patent is extended or adjusted under 35 U.S.C. 154(b) by 0 days.

(21) Appl. No.: 09/230,259

(22) PCT Filed: Jul. 21, 1997

(86) PCT No.: PCT/NO97/00189

§ 371 Date: Jan. 22, 1999

§ 102(e) Date: Jan. 22, 1999

(87) PCT Pub. No.: WO98/04881

PCT Pub. Date: Feb. 5, 1998

(30) Foreign Application Priority Data

Jul. 22, 1996 (NO) .................................................. 963047

(51) Int. Cl.[7] .................................................. G06K 9/00
(52) U.S. Cl. ...................................... 382/154; 382/152
(58) Field of Search ............................... 382/154, 152; 356/375, 376, 603, 614

(56) References Cited

U.S. PATENT DOCUMENTS

| | | | |
|---|---|---|---|
| 5,175,601 A | | 12/1992 | Fitts |
| 5,305,091 A | * | 4/1994 | Gelbart et al. ............... 356/375 |
| 5,440,392 A | * | 8/1995 | Pettersen et al. ........... 356/375 |
| 5,455,677 A | * | 10/1995 | Yoshizumi et al. .......... 356/376 |
| 5,557,410 A | | 9/1996 | Huber et al. |
| 5,973,788 A | * | 10/1999 | Pettesen et al. ............. 356/375 |

* cited by examiner

*Primary Examiner*—Andrew W. Johns
*Assistant Examiner*—Seyed Azarian
(74) *Attorney, Agent, or Firm*—Pillsbury Winthrop LLP (57) ABSTRACT

The invention relates to a system for determining spatial coordinates of points, wherein the system involves a fixed array of a network (2) of control points (3), and a manually or mechanically manipulatable measuring probe (1; 1') containing at least one camera (9', 9", 9'"), and wherein the measuring probe (1; 1') is designed for physical contact with a measuring point on an object (4) which is to be measured via a fixedly mounted contact unit (14) projecting from the measuring probe, which has a known, defined position in the coordinate system of the measuring probe; and a system unit (5) which computes the position of the contact unit (14) relative to a coordinate system defined by said control points (3) on the basis of the measuring probe's (1; 1') image of the control points (3), and the known position of the contact unit (14) in the coordinate system of the measuring probe (1; 1'). There are also methods for calibrating the measuring probe, determining the position of control points (3) in a network (2) and calibrating the contact unit (14) on the measuring probe (1; 1').

19 Claims, 5 Drawing Sheets

SYSTEM AND METHOD FOR DETERMINING SPATIAL COORDINATES

This application is the national phase of international application PCT/NO97/00189 filed Jul. 21, 1997 which designated the U.S.

FIELD OF THE INVENTION

The present invention relates to a system for determining spatial coordinates of points, and methods related to the calibration of a probe and its contact unit, and to the determination of the position of points in a network.

DESCRIPTION OF THE RELATED ART

Norwegian Patent No. 174 025 describes a system for determining spatial coordinates of points on a face or an object, where the measuring probe is made in the form of a light pen having light sources at known coordinates relative to a probe-fixed coordinate system, and where the spatial coordinates are determined by registering the image of the light sources on a sensor in a single stationary camera. The position of the light pen is thus determined in a coordinate system given by the position of the camera. The system results in limited accuracy, given by the dimensions of the light pen and the visual field of the camera.

Norwegian Patents Nos. 164 946 and 165 046 describe systems and methods based on two or more stationary or movable cameras. Great accuracy is attained by using these in that the measuring point is observed from two or more camera positions.

The object of the present invention is to redress the limitations associated with the known solutions. The system according to the present invention is thus characterised by the features which are set forth in the patent claims below. The methods mentioned above are also characterised by the features set forth in the patent claims below. These and additional distinctive features of the invention will also be set forth in the following description with reference to the appended drawings.

New, miniaturised cameras make possible a hand-held probe containing a camera, and where its position and orientation are determined on the basis of registering an image of a fixedly mounted network of reference points. The difference from the previous system as described in Norwegian Patent No. 174 025 is thus that a network of reference points is stationary relative to the object which is to be measured, whilst the probe, which according to the present invention contains one or more cameras, is moved across the object which is to be measured. Considerably higher accuracy is attained with this solution than with the previously patented system based on one camera and light pen. This is due to the fact that images of several points can be made at each registration, and their geometrical distribution can be adapted such that they are distributed across the entire visual field of the camera and at different distances from the camera-based probe.

The accuracy attainable with this system solution is comparable to what was previously attainable with a minimum of two cameras which view the object which is to be measured from two different directions of observation. This invention thus provides a system which is far simpler, is low in weight and complexity, and low in production costs.

The probe can be made wireless in that the image is transmitted from the camera to a central unit by radio signals or infrared communication.

Figure 1A:
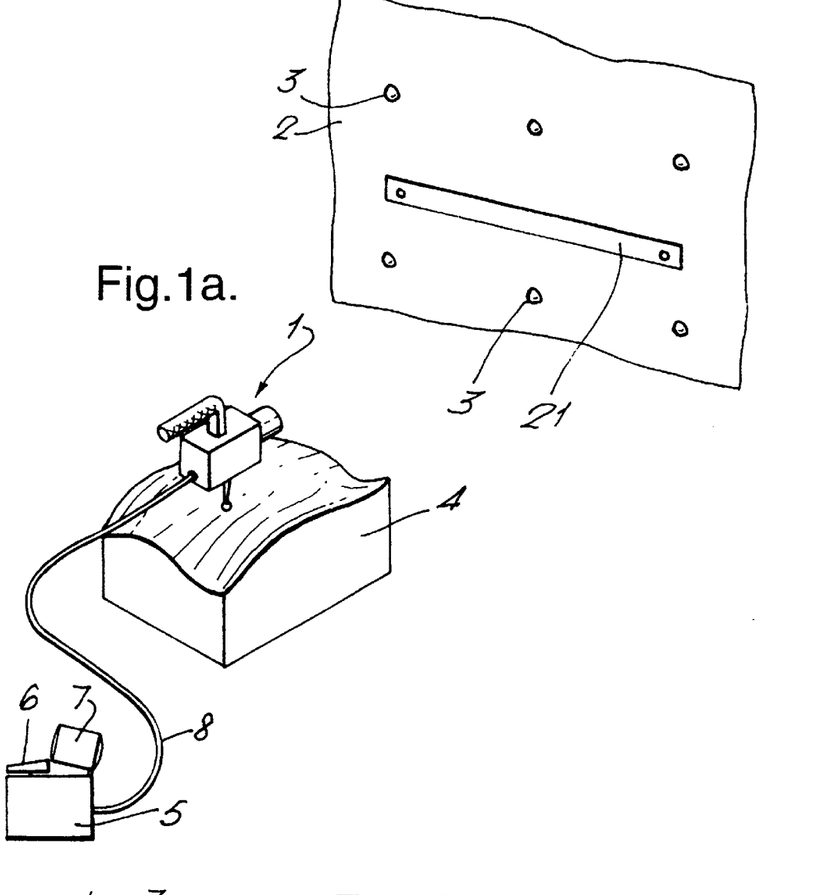
FIGS. 1a and 1b show the measuring system and the use thereof.
Figure 1B:
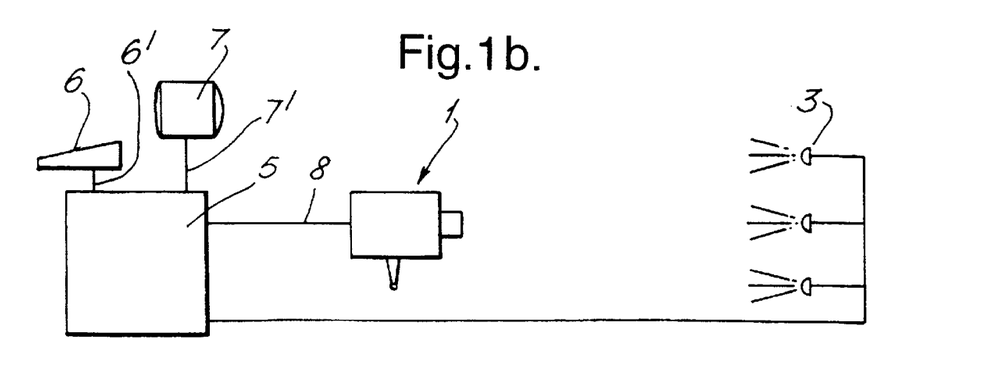

The measuring system and the use thereof are outlined in FIGS. 1a and 1b. The system consists of a measuring probe 1 based on one or more cameras in one unit, and a network 2 of control points 3, a system unit containing computer unit 5 and an operator console 6, 7. Usually, the operator console will consist of a keyboard 6 and a monitor 7. The measuring probe 1 is normally connected to the system unit 5 via a cable 8. The principle of measurement is that the camera-based probe 1 touches the object 4 at the point which is to be coordinate-determined, that the camera in this position makes images the whole of or parts of the network 2 of control points 3, and that the spatial position of the probe is computed on the basis of the registered image.

Figure 2A:
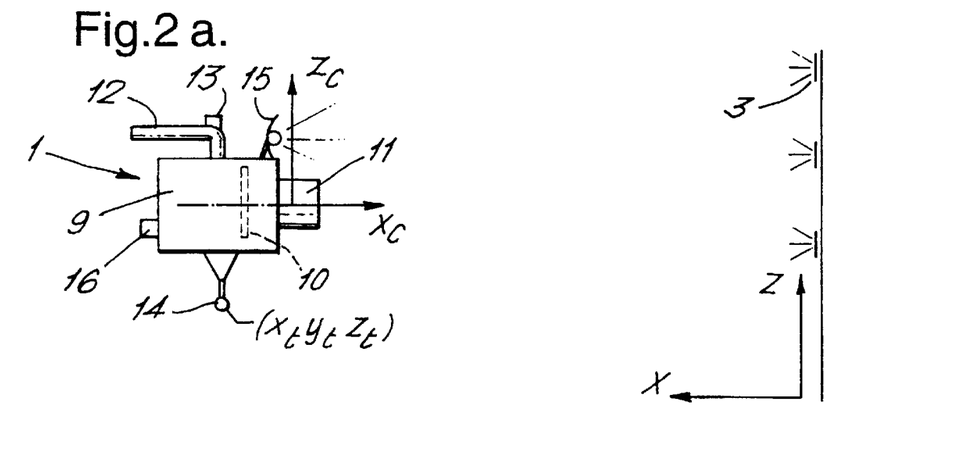
FIGS. 2a, 2b and 2c show a camera-based probe respectively in side view, top view and from below.
Figure 2B:
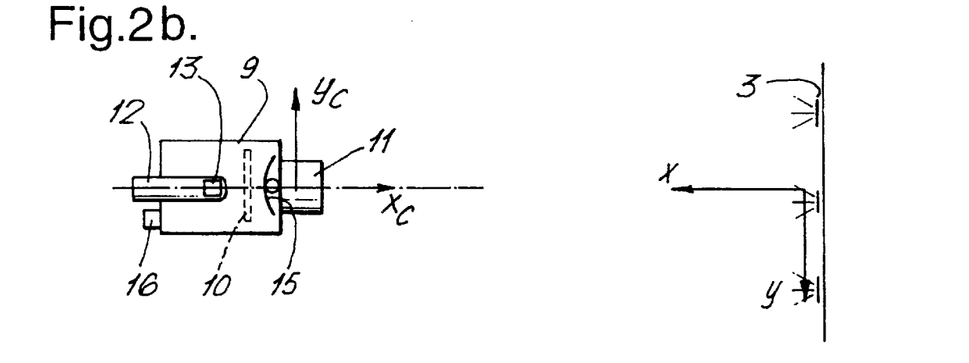
Figure 2C:
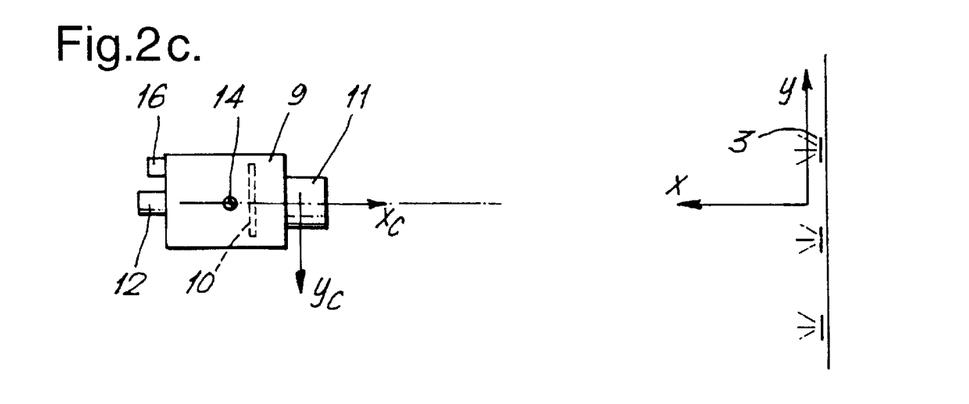

As shown in FIGS. 2a, 2b and 2c, the probe consists of a camera 9 with handle 12 mounted thereon, exposure button 13 and contact unit 14. Normally, the camera is a video camera 10, e.g., based on CCD (Charge Coupled Device) or CID (Charge Injected Device) sensor technology, with lens 11. The exposure button 13 is manipulated to actuate an image making of the network 2 of control points 3. The contact unit 14 is a replaceable unit, e.g., in the form of a tip or a sphere. The position of the probe 1 is related to the centre of the contact unit 14. This presupposes that the position of the centre is known relative to the coordinate system of the probe 1. Method for this are described below. If the contact unit 14 is a sphere, the analysis of the measurement results must include compensation for the radius of the sphere. This could be avoided by instead using a tip-shaped contact unit.

Figure 3:
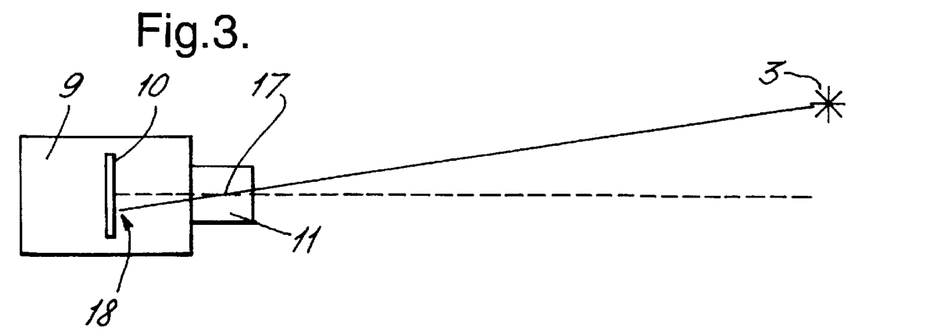
FIG. 3 shows a simplified, ideal camera model.

According to the camera model which is outlined in FIG. 3, the optics 11 of the camera 9 may be represented as a tiny hole, a so-called "pinhole" 17. Images of all points 3 are recorded on the sensor 10 as an ideal rectilinear projection through this hole 17 (the centre of projection) of an image point 18. In a practical camera, lens error such as distortion will involve this straight line from the object point being deflected through the lens. It is possible to compensate for the error which occurs as a result of this deviation from the simplest camera model by calibrating the camera. In this context calibrating means determining the relation between the true image of a point on the sensor, and the spatial direction to the point relative to a camera-fixed coordinate system.

A network 2 of control points 3 is mounted around the object which is to be measured. In FIGS. 1 and 2 control points are only given in one plane on one side of the object which is to be measured. It would be advantageous to have control points on several sides of the object, optionally above and/or below, and at different distances from the object. This would give improved accuracy and ensure unambiguous mathematical solutions. The control points are so formed that they are easily identifiable in relation to the background. This may be as points or patterns (circles, crosses) painted in white on a black background, retroreflective measuring points, so-called targets, or active light sources (e.g., light emitting diodes). Other easily identifiable patterns may also be used. To register retroreflective targets the camera or probe should have a powerful light source mounted thereon, e.g., a flash unit 15, which illuminates the points 3 when creating images. When using active light sources instead of retroreflective targets, these may be on continuously, or may be switched on synchronously with the exposure control of the camera.

The network 2 may be mounted on a movable object, e.g., a frame which is brought to the object that is to be measured.

The position of the individual control points 3 in the network 2 must be known with the greatest accuracy possible in order to be able to compute the position of the probe 1 on the basis of a single image. Methods for determining the position of the control points 3 in relation to one another are described below.

The determination of camera position relative to the network 2 of points having known coordinates will now be described in more detail. To understand this description it is essential to distinguish between the following coordinate systems:

The network's spatial coordinate system. The coordinates of the network points 3 are known relative to this coordinate system.

The internal coordinate system of the camera (probe). All registrations by the camera's sensor are related to this coordinate system.

The coordinate system of the object which is to be measured. When measuring, e.g., points on a car body, it is desirable for these to be related to a car-fixed coordinate system. A coordinate system of this kind is defined by specific points on the object, where these points are defined as having certain coordinate values.

Figure 4:
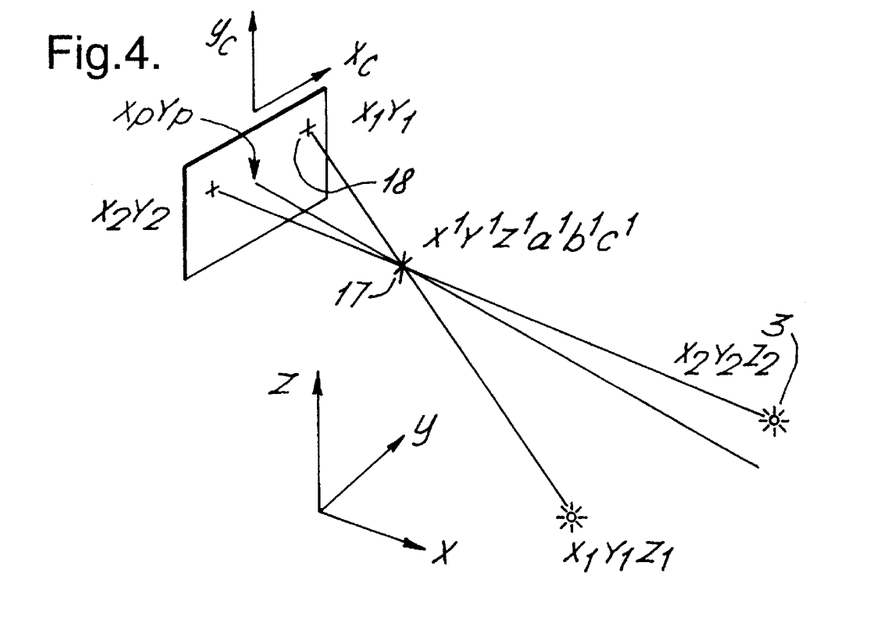
FIG. 4 shows determination of camera position in a network having known coordinates.

The image of the network 2 of control points 3 gives a number of image points 18 on the sensor 10 of the camera as shown in FIG. 4. On the basis of these registered image points in the coordinate system of the camera (probe) and knowledge of the spatial coordinates of the control points 3 in a stationary, space-fixed coordinate system, it is possible to compute the position and orientation of the probe 1 relative to the stationary spaced-fixed coordinate system 2.

There are different methods for carrying out this computation. The simplest would be to make a direct coordinate transformation between the coordinates of the image points in the camera-fixed coordinate system and the associated known coordinates of the points in the network's coordinate system. An accurate and approved method consists of making a bundle adjustment as known from photogrammetric technique.

An efficient computation presupposes that it is known or rapidly discovered which image points correspond to which points in the network. This may be based on the points in the network being arranged in easily identifiable patterns, and that standard algorithms for pattern recognition are used for identification.

There are no limitations on the orientation of the probe 1, but the accuracy of determination of its position and orientation will depend upon how many of the control points 3 are made images of, and the spatial distribution of these. The image making of network points must take place so quickly that vibrations or the operator's movements do not have any effect upon the accuracy of measurement. The exposure time will typically be about $\frac{1}{1000}$ of a second.

A method of calibrating a video camera to determine spatial direction is described in Norwegian Patent No. 165 046. Within the field of photogrammetry other methods are known that are based on a network of points in known or unknown positions being photographed from a camera in different positions and orientations relative to the network. The calibration of the camera consists of a number of correction parameters being determined, so that the image of one point may be considered as an ideal projection through the projection centre of the camera. As an alternative to correction parameters, a calibration table could be established corresponding to the relation between the real and ideal image of a point.

Photogrammetric calibration methods are described in, e.g., H. M. Kamara (Ed.): Non-topographic photogrammetry. Second Edition, 1987.

Figure 5:
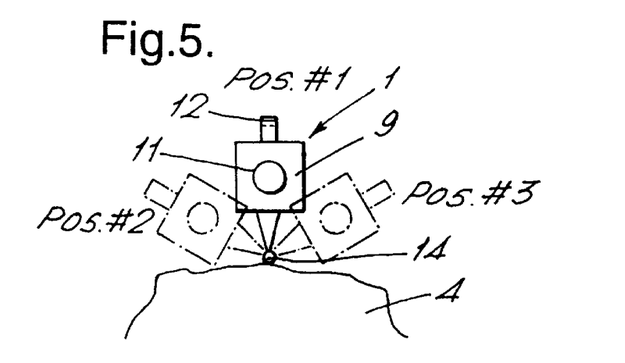
FIG. 5 shows how the position of the contact unit can be determined.

Calibration of the contact unit relative to a probe-fixed coordinate system will now be described in more detail. When measuring a point, the position of the probe 1 is required to be related to the centre of the contact unit 14. This requires knowledge of the position of the contact unit 14 relative to the coordinate system of the probe 1 (camera). A simple method of determining the position of the contact unit 14 is outlined in FIG. 5. This consists of holding the contact unit 14 at a fixed point, whilst the probe itself is moved around this fixed point. A number of registrations (e.g., as in the illustrated example) of the position and orientation of the probe 1 (camera) relative to the network 2 are made for different orientations of the probe. By combining registered position and orientation of the probe 1 for each registration with the information that the point of contact 14 was held still, the position of the centre of the contact unit 14 can be determined relative to both the network's coordinate system 2, and to the internal coordinate system 1 of the probe.

This method is so simple and so fast to carry out that it makes possible the use of replaceable contact units in order to allow varied lengths and orientations of the contact unit relative to the rest of the probe.

The coordinates of the individual points 3 in the network 2 can be determined by making images of the control points 3 from different directions by means of the probe unit 1. This requires the observation of each individual control point 3 from a minimum of two different directions. This procedure can be carried out as a separate process by using a precalibrated probe unit, or can be combined with the calibration of the probe.

To be able to give the network's dimensions a correct scale, the distance between a minimum of two of the points in the network must be known, so that it can used as a scale factor in the bundle adjustment. If there are no known distances between fixed points in the network, it is possible by measuring the network to provide a distance standard in the network. The distance standard may be in the form of a rod 21 having control points of the same type as in the network. The distance between these control points must be known.

The accuracy in the determination of the position and orientation of the probe will be influenced by a number of geometrical factors:

dimension of the network, and distance between probe and network density and form of control points in the network
the visual field of the camera (aperture angle)

Figure 6A:
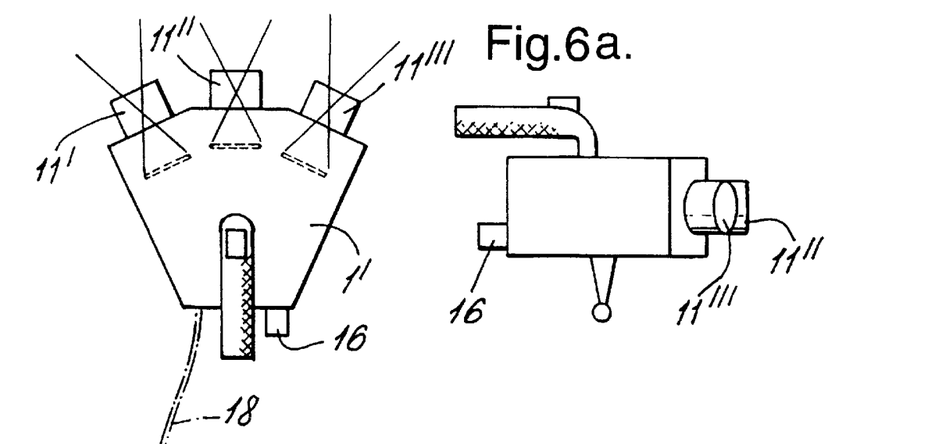
FIGS. 6a and 6b shows a probe with several camera units.
Figure 6B:
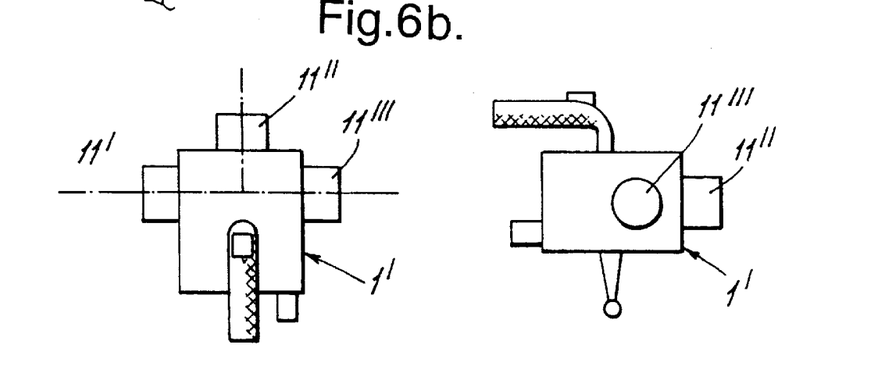

Improved accuracy may be attained by mounting several camera units with associated lenses 11', 11", 11''' together in a single probe as shown in FIGS. 6a and 6b. These may have wholly or partly overlapping visual fields as indicated in FIG. 6a, or different fields as shown in FIG. 6b. The whole probe will have the same basic mode of operation as described above for a probe containing a single camera. The observations from the individual cameras will all be related to a common probe-fixed coordinate system. The image making of the network must be done synchronously by the individual cameras.

The calibration method described for a probe based on one camera can be extended to handle several cameras in one unit. These will have independent calibration parameters. In addition, position and orientation of the individual cameras can be determined relative to a common probe-fixed coordinate system.

Figure 7:
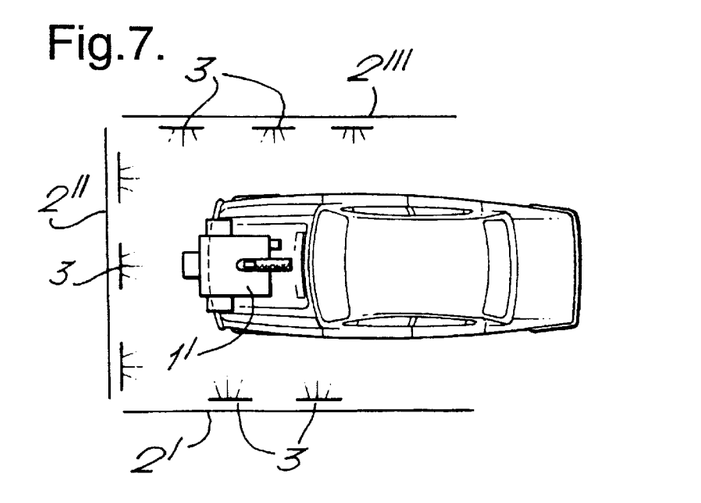
FIG. 7 illustrates the use of the invention for three-dimensional measuring in connection with a three-dimensional object, e.g., a car model.

FIG. 7 shows how the probe 1' can be used to measure points on the surface of a car, and wherein the network 2 is divided into several sub-networks 2', 2" and 2''' of points 3.

Figure 8:
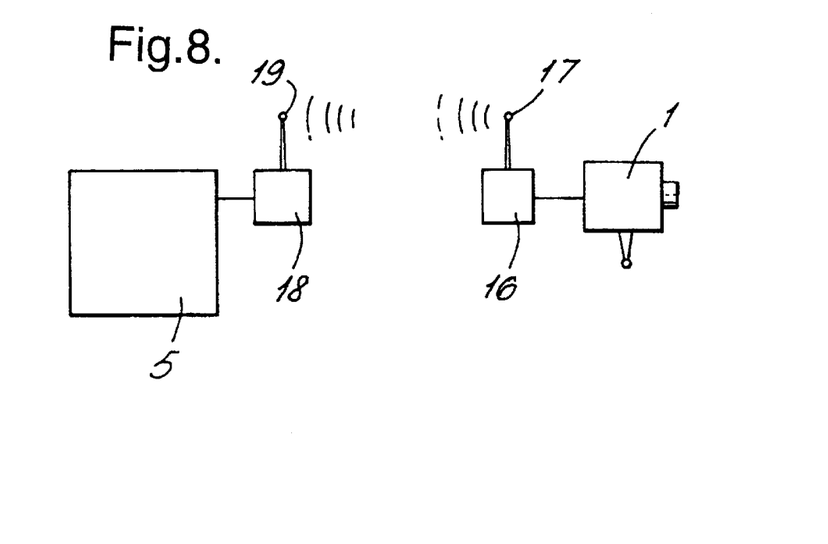
FIG. 8 shows the principle of wireless transmission of signals between probe and system unit.

To avoid problems with cabling to the probe, the probe can be made wireless by mounting therein a module 16, 17 to transmit the image to a receiver module 18, 19 on the central unit via radio signals or infrared communication. It is not necessary to feed control signals back to the probe unit. FIG. 8 shows the probe 1 connected to a transmitter 16 having antenna 17, and where the system unit 5 is equipped with a receiver 18 having antenna 19. Although the configuration is intended primarily for radio signals, it will be understood that the arrangement with some modifications is just as suitable for infrared communication.

Figure 9:
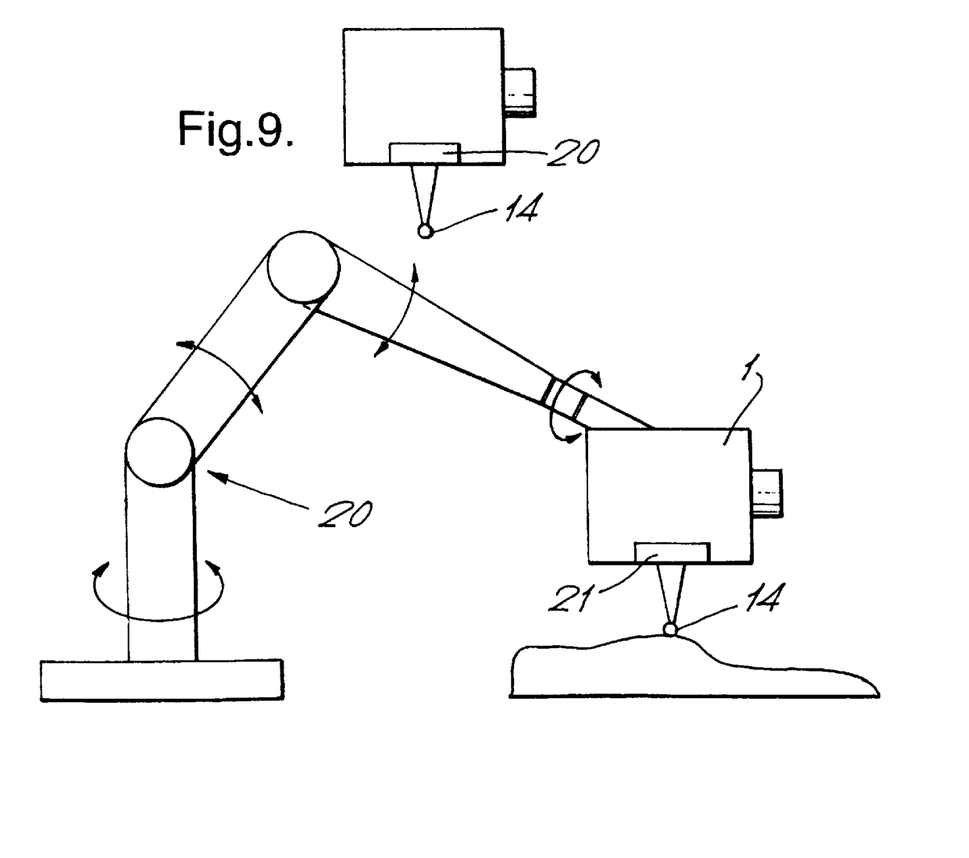
FIG. 9 shows the probe mounted on a robot.

The measuring method can be automated by mounting the probe on a robot 20 or another mechanical device to guide the probe to a number of selected measuring points. The probe 1 may contain a sensor unit 21 for registering that the contact unit 14 is in physical contact with the object. When contact is registered, the position and orientation of the probe are automatically registered by making an image of the network 2.

What is claimed is:

1. A system for determining spatial coordinates of points, wherein the system involves a fixed array of a network of control points, comprising:

a manually or mechanically manipulatable measuring probe containing at least one camera and wherein the measuring probe is designed for physical contact with a measuring point on an object which is to be measured via a fixedly mounted contact unit projecting from the measuring probe, which has a known, defined position in the coordinate system of the measuring probe; and a system unit which computes the position of contact unit relative to a coordinate system defined by said control points on the basis of the measuring probe's image making of the control points, and the known position of the contact unit in the coordinate system of the measuring probe, wherein the measuring probe has a contact sensor which is functionally connected to the contact unit for registering mechanical contact between the contact unit and the object which is to be measured at the measuring point, the contact sensor on said registration causing automatic position measurement.

2. A system for determining spatial coordinates of points, wherein the system involves a fixed array of a network of control points, comprising:

a manually or mechanically manipulatable measuring probe containing at least one camera and wherein the measuring probe is designed for physical contact with a measuring point on an object which is to be measured via a fixedly mounted contact unit projecting from the measuring probe, which has a known, defined position in the coordinate system of the measuring probe; and a system unit which computes the position of contact unit relative to a coordinate system defined by said control points on the basis of the measuring probe's image making of the control points, and the known position of the contact unit in the coordinate system of the measuring probe, wherein the measuring probe is equipped with a powerful light source.

3. A system as disclosed in claim 2, wherein the light source is a flash unit.

4. A system for determining spatial coordinates of points, wherein the system involves a fixed array of a network of control points, comprising:

a manually or mechanically manipulatable measuring probe containing at least one camera and wherein the measuring probe is designed for physical contact with a measuring point on an object which is to be measured via a fixedly mounted contact unit projecting from the measuring probe, which has a known, defined position in the coordinate system of the measuring probe; and a system unit which computes the position of contact unit relative to a coordinate system defined by said control points on the basis of the measuring probe's image making of the control points, and the known position of the contact unit in the coordinate system of the measuring probe, wherein said control points consist of one or more of the following types: active light sources, passive light sources, light reflecting targets, easily identifiable objects or patterns, and said network of control points being mounted on a movable object.

5. A method for calibrating a manually or mechanically manipulatable measuring probe in a system intended for determining spatial coordinates of points, the system having a fixed array of a network of control points, at least one camera on said measuring probe, the measuring probe being designed for physical contact with a measuring point on an object which is to be measured via a fixedly mounted contact unit projecting from the measuring probe, which has a known, defined position in the coordinate system of the measuring probe; and a system unit for computing the position of the contact unit relative to a coordinate system defined by said control points on the basis of the measuring probe's image making of the control points, and the known position of the contact unit in the coordinate system of the measuring probe, the method comprising the steps of:

moving the camera or cameras of the measuring probe to a number of different observation directions or orientations;

successively recording in the camera or cameras images of the fixed array of the control points in the network from said different observation directions or orientations; and correlating the successive images with one another to establish a number of correction parameters or a calibration table corresponding to the relation between the real and ideal image of a point which is due to the optical properties of the camera or cameras.

6. A method as disclosed in claim 5, wherein the measuring probe has at least two cameras, further comprising the step of:

causing the optical properties of each camera to be determined by bundle adjustment.

7. A method for determining the position of control points in a fixed array of a network of control points which is a part of a system used for determining spatial coordinates of points, the system further having a manually or mechanically manipulatable measuring probe containing at least one camera, the measuring probe being designed for physical contact with a measuring point on an object which is to be measured via a fixedly mounted contact unit projecting from the measuring probe, which has a known, defined position in the coordinate system of the measuring probe; and a system unit for computing the position of the contact unit relative to a coordinate system defined by said control points on the basis of the measuring probe's image making of the control points, and the known position of the contact unit in the coordinate system of the measuring probe, the distance between at least two of the control points being known, the method comprising the steps of:

moving the camera or cameras of a calibrated measuring probe to at least two different directions of observation;

recording in the camera or cameras an image of the fixed array of the control points in the network from said different directions of observation; and     establishing a table of coordinate values for the control points in a coordinate system for the network defined by a selection of the control points.

8. A method as disclosed in claim 7, further comprising the step of:

causing the spatial coordinates of the control points to be determined by bundle adjustment.

9. A method for calibrating a manually or mechanically manipulatable measuring probe in a system used for determining spatial coordinates of points, the system having a fixed array of a network of control points, at least one camera on said measuring probe, the measuring probe being designed for physical contact with a measuring point on an object which is to be measured via a fixedly mounted contact unit projecting from the measuring probe, which has a known, defined position in the coordinate system of the measuring probe; and a system unit for computing the position of the contact unit relative to a coordinate system defined by said control points on the basis of the measuring probe's image making of the control points, and the known position of the contact unit in the coordinate system of the measuring probe, where the poition of control points in a network which form part of the system are determined concurrently, the distance between at least two of the control points being known, the method comprising the steps of:

moving the camera or cameras of the calibrated measuring probe to at least two different directions of observation;

recording in the camera or cameras an image of the fixed array of the control points in the network from said different directions of observation; and     establishing a table of coordinate values for the control points in a coordinate system for the network defined by a selection of the control points and in the same computation correlating the images for establishing a number of correction parameters or a calibration table corresponding to the relation between the real and ideal image of a point.

10. A method for calibrating a contact unit on a manually or mechanically manipulatable measuring probe in a system used for determining spatial coordinates of points, the system having a fixed array of a network of control points, at least one camera on said measuring probe, the measuring probe being designed for physical contact with a measuring point on an object which is to be measured via a fixedly mounted contact unit projecting from the measuring probe, which has a known, defined position in the coordinate system of the measuring probe; and a system unit for computing the position of the contact unit relative to a coordinate system defined by said control points on the basis of the measuring probe's image making of the control points, and the known position of the contact unit in the coordinate system of the measuring probe the method comprising the steps of:

moving the camera or cameras of the calibrated measuring probe to a number of different observation directions or orientations, while its contact unit remains in contact with the fixed reference point or measuring point on an object;

registering the position and orientation of the measuring probe relative to a network of control points in that in the camera or cameras there is recorded an image of the fixed array of the control points in the network for each of said directions or orientations; and     combining registered position and orientation of the measuring probe for each registration with information that the point of contact for the contact unit is the same, whereby the position of the center of contact unit is determined in relation to the network's coordinate system and the internal coordinate system of the measuring probe.

11. A system as disclosed in claim 4, wherein the measuring probe has a contact sensor which is functionally connected to the contact unit for registering mechanical contact between the contact unit and the object which is to be measured at the measuring point, the contact sensor on said registration causing automatic position measurement.

12. A system as disclosed in claim 4, wherein the measuring probe is equipped with a powerful light source.

13. A method for calibrating a measuring probe in a system used for determining spatial coordinates of points, the system including:

a fixed array of a network of control points, a manually or mechanically manipulatable measuring probe containing at least one camera, the measuring probe being designed for physical contact with a measuring point on an object which is to be measured via fixedly mounted contact unit projecting from the measuring probe, which has a known, defined position in the coordinate system of the measuring probe; and a system unit for computing the position of the contact unit relative to a coordinate system defined by said control points on the basis of the measuring probe's image making of the control points, and the known position of the contact unit in the coordinate system of the measuring probe, the method comprising:

moving the camera or cameras of the measuring probe to a number of different observation directions or orientations;

successively recording in the camera or cameras images of the fixed array of the control points in the network from said different observation directions or orientations; and     correlating the successive images with one another to establish a number of correction parameters or a calibration table corresponding to the relation between the real and ideal image of a point which is due to the optical properties of the camera or cameras.

14. A method as disclosed in claim 13, wherein the measuring probe has at least two cameras, further comprising:

causing the optical properties of each camera to be determined by bundle adjustment.

15. A method for determining the position of control points in a network which is part of a system used for determining spatial coordinates of points, the system including:

a fixed array of a network of control points, a manually or mechanically manipulatable measuring probe containing at least one camera, the measuring probe being designed for physical contact with a measuring point on an object which is to be measured via a fixedly mounted contact unit projecting from the measuring probe, which has a known, defined position in the coordinate system of the measuring probe; and a system unit for computing the position of the contact unit relative to a coordinate system defined by said control points on the basis of the measuring probe's image making of the control points, and the known position of the contact unit in the coordinate system of the measuring probe, wherein the distance between at least two of the control points is known, the method comprising:

moving the camera or cameras of a calibrated measuring probe to at least two different directions of observation;

recording in the camera or cameras an image of the fixed array of the control points in the network from said different directions of observation; and establishing a table of coordinate values for the control points in a coordinate system for the network defined by a selection of the control points.

16. A method as disclosed in claim 15, further comprising:

causing the spatial coordinates of the control points to be determined by bundle adjustment.

17. A method for calibrating a measuring probe in a system used for determining spatial coordinates of points, the system including:

a fixed array of a network of control points, a manually or mechanically manipulatable measuring probe containing at least one camera, the measuring probe being designed for physical contact with a measuring point on an object which is to be measured via a fixedly mounted contact unit projecting from the measuring probe, which has a known, defined position in the coordinate system of the measuring probe; and a system unit for computing the position of the contact unit relative to a coordinate system defined by said control points on the basis of the measuring probe's image making of the control points, and the known position of the contact unit in the coordinate system of the measuring probe, where the position of control points in a network which form part of the system are determined concurrently, the distance between at least two of the control points being known, the method comprising:

moving the camera or cameras of the calibrated measuring probe to at least two different directions of observation;

recording in the camera or cameras an image of the fixed array of the control points in the network from said different directions of observation; and establishing a table of coordinate values for the control points in a coordinate system for the network defined by a selection of the control points and in the same computation correlating the images for establishing a number of correction parameters or a calibration table corresponding to the relation between the real and ideal image of a point.

18. A method for calibrating the contact unit on a measuring probe in a system used for determining spatial coordinates of points, the system including:

a fixed array of a network of control points, a manually or mechanically manipulatable measuring probe containing at least one camera, the measuring probe being designed for physical contact with a measuring point on an object which is to be measured via a fixedly mounted contact unit projecting from the measuring probe, which has a known, defined position in the coordinate system of the measuring probe; and a system unit for computing the position of the contact unit relative to a coordinate system defined by said control points on the basis of the measuring probe's image making of the control points, and the known position of the contact unit in the coordinate system of the measuring probe, comprising:

moving the camera or cameras of the measuring probe to a number of different observation directions or orientations, whilst its contact unit remains in contact with a fixed reference point or measuring point on an object;

registering the position and orientation of the measuring probe relative to a network of control points in that in the camera or cameras there is recorded an image of the fixed array of the control points in the network for each of said directions or orientations; and combining registered position and orientation of the measuring probe for each registration with information that the point of contact for the contact unit is the same, whereby the position of the centre of contact unit is determined in relation to the network's coordinate system and the internal coordinate system of the measuring probe.

19. A system as in claim 12 wherein the light source is a flash unit.

* * * * *